United States Patent
Bösenberg et al.

(10) Patent No.: US 12,446,486 B2
(45) Date of Patent: Oct. 21, 2025

(54) METHOD FOR DETERMINING A CONDITION OF HARVESTED CROP CONVEYED BY A ROOT CROP CONVEYOR

(71) Applicant: Grimme Landmaschinenfabrik GmbH & Co. KG, Damme (DE)

(72) Inventors: Daniel Bösenberg, Emsdetten (DE); Wolfram Strothmann, Osnabrück (DE)

(73) Assignee: Grimme Landmaschinenfabrik GmbH & Co. KG, Damme (DE)

( * ) Notice: Subject to any disclaimer, the term of this patent is extended or adjusted under 35 U.S.C. 154(b) by 214 days.

(21) Appl. No.: 18/245,505

(22) PCT Filed: Sep. 15, 2021

(86) PCT No.: PCT/EP2021/075348
§ 371 (c)(1),
(2) Date: Mar. 15, 2023

(87) PCT Pub. No.: WO2022/058359
PCT Pub. Date: Mar. 24, 2022

(65) Prior Publication Data
US 2023/0329142 A1    Oct. 19, 2023

(30) Foreign Application Priority Data
Sep. 15, 2020 (DE) .......................... 102020124037.6

(51) Int. Cl.
*B65G 43/08* (2006.01)
*A01D 17/00* (2006.01)
*A01D 33/10* (2006.01)

(52) U.S. Cl.
CPC ............. *A01D 17/00* (2013.01); *B65G 43/08* (2013.01)

(58) Field of Classification Search
CPC .................................. A01D 17/00; B65G 43/08
USPC ........................................................ 198/340
See application file for complete search history.

(56) References Cited

U.S. PATENT DOCUMENTS

| | | | |
|---|---|---|---|
| 3,435,950 A | 4/1969 | Suverkrop | |
| 5,244,100 A | 9/1993 | Regier et al. | |
| 6,205,384 B1 * | 3/2001 | Diekhans | A01D 41/127 701/25 |
| 8,816,235 B2 | 8/2014 | Soler Esteban et al. | |

(Continued)

FOREIGN PATENT DOCUMENTS

| | | |
|---|---|---|
| CN | 102706763 A | 10/2012 |
| CN | 105564969 A | 5/2016 |

(Continued)

OTHER PUBLICATIONS

US 2018/0042176 A1, Obropta et al., Feb. 15, 2018.*

(Continued)

*Primary Examiner* — Douglas A Hess
(74) *Attorney, Agent, or Firm* — Husch Blackwell LLP

(57) ABSTRACT

A method is provided in which measurement data that characterize at least one condition of at least one root crop conveyed by the root crop conveyor device are measured by at least one measuring device. Result data which are dependent at least on the measurement data are then calculated by an evaluation device. The result data serve, indirectly or directly, for the adjustment of the root crop conveyor. The result data or a signal dependent thereon are/is then provided by the evaluation device.

21 Claims, 7 Drawing Sheets

(56) References Cited

U.S. PATENT DOCUMENTS

| | | | | |
|---|---|---|---|---|
| 9,756,785 B2* | 9/2017 | Butts | | G01S 17/88 |
| 10,371,561 B2* | 8/2019 | Darr | | G01F 25/0084 |
| 11,006,577 B2* | 5/2021 | Jelenkovic | | G06T 7/62 |
| 11,533,843 B2* | 12/2022 | Gururajan | | A01D 33/00 |
| 11,744,180 B2* | 9/2023 | Gunda | | A01B 79/005 |
| | | | | 56/10.2 A |
| 11,812,694 B2* | 11/2023 | Dighton | | A01D 41/141 |
| 12,181,889 B2* | 12/2024 | Qadir | | G05D 1/2465 |
| 2017/0121122 A1 | 5/2017 | Blanc | | |
| 2020/0084963 A1 | 3/2020 | Gururajan et al. | | |

FOREIGN PATENT DOCUMENTS

| | | | |
|---|---|---|---|
| DE | 272425 C | | 4/1914 |
| DE | 4127903 A1 | | 4/1993 |
| DE | 19804147 A1 | | 8/1998 |
| EP | 938837 A1 | | 9/1999 |
| EP | 3785516 A1 | | 3/2021 |
| FR | 2874424 A1 | | 2/2006 |
| JP | 62183893 A | | 8/1987 |
| JP | H09220010 A | | 8/1997 |
| JP | 2007069061 A | | 3/2007 |
| WO | 2020094653 A1 | | 5/2020 |
| WO | 2020094655 A1 | | 5/2020 |

OTHER PUBLICATIONS

Blanes, C., et al., "Assessment of eggplant firmness with accelerometers on a pneumatic robot gripper", Computers and Electronics in Agriculture, vol. 113, Apr. 2015, pp. 44-50, https://www.sciencedirect.com/science/article/abs/pii/S0168169915000289.

Mahendran, R., et al., "Application of Computer Vision Technique on Sorting and Grading of Fruits and Vegetables", Food Processing & Technology, Jan. 2012, https://www.researchgate.net/publication/308953918_Application_of_Computer_Vision_Technique_on_Sorting_and_Grading_of_Fruits_and_Vegetables DOI: 10.4172/2157-7110.S1-001.

Examination Notice dated Mar. 5, 2025, issued in corresponding European Ser. No. 21783156.9.

Morquin, Demian et al., "An integrated neural network-based vision system for automated separation of clods from agricultural produce", Engineering Application of Arificial Intelligence., vol. 16, pp. 45-55, Feb. 15, 2003 (Feb. 15, 2003), XP093039217, ISSN: 0952-1976, DOI: 10.1016/S0952-1976(03)00029-0.

* cited by examiner

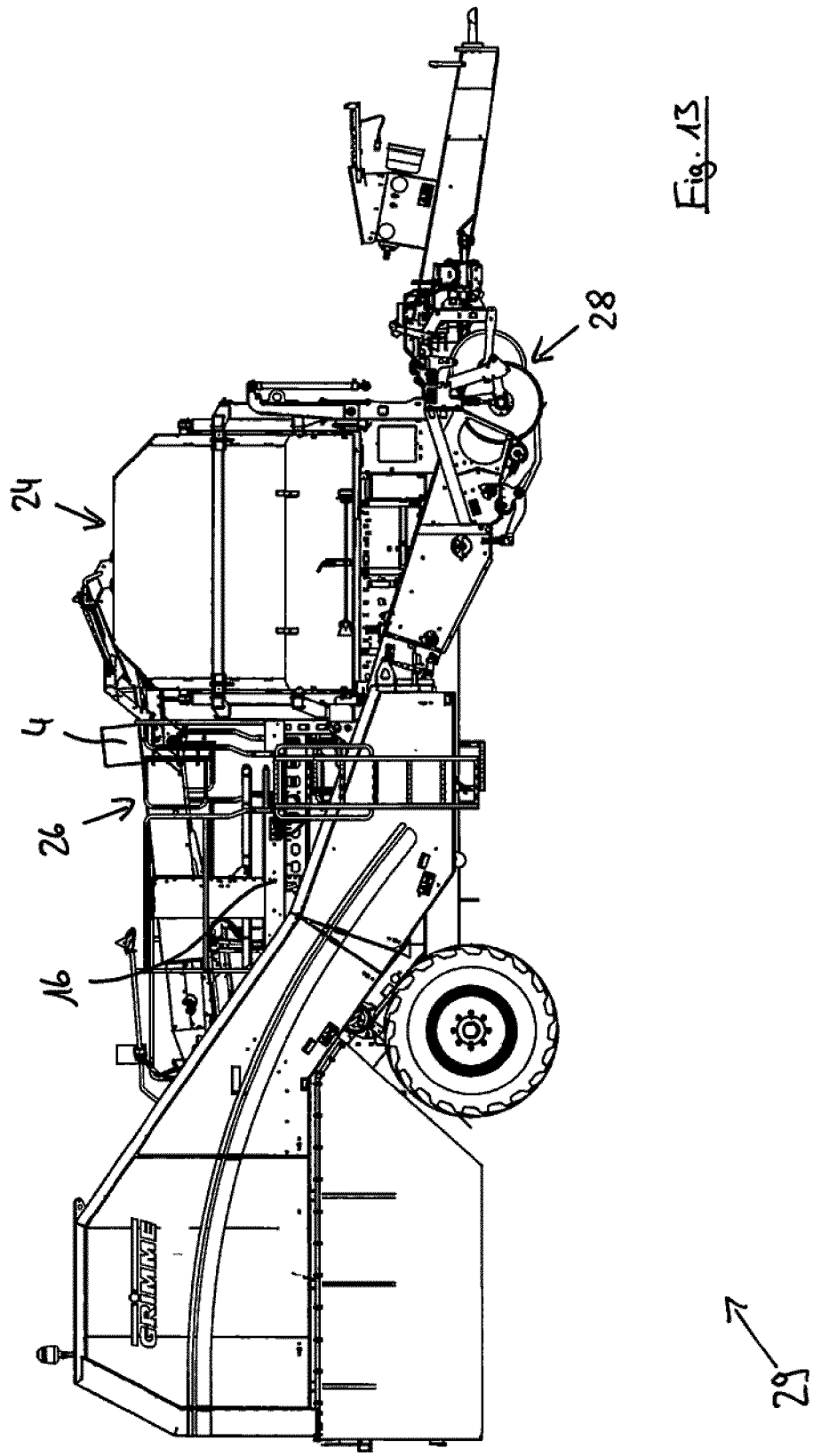

METHOD FOR DETERMINING A CONDITION OF HARVESTED CROP CONVEYED BY A ROOT CROP CONVEYOR

CROSS REFERENCE

This application claims priority to PCT Application No. PCT/EP2021/075348, filed Sep. 15, 2021, which itself claims priority to German Patent Application No. 10 2020 124037.6, filed Sep. 15, 2020, the entireties of both of which are hereby incorporated by reference.

FIELD OF THE INVENTION

The invention relates to a method for determining a characteristic of harvested material conveyed by a root crop conveyor.

BACKGROUND OF THE INVENTION

Root crop conveyors serve to rearrange root crops, for example as part of harvesters or when storing the root crops or removing them from storage. By determining the characteristic, it is possible to ascertain how well the functions of the root crop conveyor device are being fulfilled. In the method known from DE 10 2018 127 844 A1, directions of movement, for example, of conveyed root crops are determined. Methods for determining a ratio of root crops to extraneous materials in the harvested material are also known.

Nonetheless, the known methods have the disadvantage that, despite their use, a significant proportion of the root crops rots as a result of being conveyed and as a result of forces acting on the root crops, and thus cannot be utilized further for starch production, or for food production.

BRIEF SUMMARY OF THE INVENTION

The object of the present invention is to provide a method, a root crop conveyor device and a root crop harvester, by means of which more gentle and nevertheless efficient root crop conveying is made possible.

According to the invention, the object is achieved by a method of the type in question, which comprises the following three steps. In a first step, measurement data that characterize at least one condition of at least one root crop conveyed by the root crop conveyor device are measured by at least one measuring device.

The measuring device is in particular included in the root crop conveyor. The measurement data are the data that are provided by the measuring device as a direct result of the measurement. The measurement takes place in particular during or after the conveying of the root crop by the root crop conveyor, but preferably at or in the immediate vicinity of the root crop conveyor. When the root crop is conveyed, it is in particular part of a stream of harvested material, which may also contain undesirable extraneous material such as stones, clods or plant residues, such as weeds.

The condition of the root crop, which is in particular a beet or a potato, is at least one property of the root crop which is inherent therein in particular independently of a conveying speed, a conveying direction and/or a position in or on the root crop conveyor. Preferably, the condition is independent of extraneous material or of soil that adheres to the root crop and is conveyed with the root crop. The condition means in particular a property of the surface, or skin, of the root crop and/or of the inside of the root crop located beneath the surface. The property is in particular a color, a size, a shape, a firmness and/or a deformability of the root crop. The condition of root crops to be harvested is on the one hand generally inhomogeneous even before they are harvested and independent of the root crop variety, the soil conditions, etc. On the other hand, the condition can be changed or even impaired during conveying by the root crop conveyor.

In a second step of the method, result data which are dependent at least on the measurement data are calculated by an evaluation device. The result data serve, indirectly or directly, for the adjustment of the root crop conveyor.

The evaluation device in particular carries out an interpretation of the measurement data. Preferably, the measurement data are evaluated at least such that the measured condition of the root crop is classified as blemish-free or blemished, or undamaged or damaged. Preferably, the grade of a blemish that is detected, or the position thereof, is ascertained. The result data are in particular based solely on the measurement data. Alternatively, the result data are preferably based both on the measurement data and on further data, which take account of, for example, the root crop variety, the soil condition and/or the weather as influencing variables and in particular can be specified by the user.

In a third step of the method, the result data or a signal dependent thereon are/is provided by the evaluation device.

The result data, or the signal, are/is in particular outputted visually and/or acoustically, preferably in the vicinity of a machine operator. Preferably, at least a signal is outputted if the condition is rated as unsatisfactory over a specific time period. Preferably, a quality characteristic value, which characterizes the condition of one or more root crops on the basis of one or more measurements, is outputted continuously. On the basis of the result data or of the signal, it is significantly easier for the operator of the root crop conveyor device to operate the root crop conveyor device optimally, in particular to the benefit of protection of the root crop.

By measuring and evaluating the condition of conveyed root crops, it is possible to assess the quality, in particular the storability, thereof. When an unsatisfactory condition and a generally accompanying tendency of the root crops to rot is ascertained, the operator can adapt the setting of the root crop conveyor device immediately in order to improve the condition or to reduce the negative impact of the root crop conveyor device on the condition. By means of the method according to the invention, the success of the adaptation can be checked immediately. Moreover, owing to the method, the root crop conveyor device does not need to be operated with unnecessarily low efficiency in order to protect the root crop, and in any case the optimal compromise between protection of the root crop and as high a throughput of harvested material as possible can be achieved.

Preferably, the evaluation device, on the basis of the measurement data, determines information relating to the presence and/or to the degree of mechanical damage, in particular internal mechanical damage. Mechanical damage is in particular pressure spots, scarring, cuts, abrasions or bruising. Pressure spots are regions of root crops close to the surface or adjacent to the surroundings that have been exposed to a relatively high external pressure in the past. This generally results in a softer consistency of the root crop in that region and a greater tendency of the root crop to rot. In particular, the measuring device is configured such that it measures at least a firmness or softness of the root crop or another characteristic of the region. Pressure spots created in particular by machine parts can thus reliably be detected, even before the chemical, biological and/or physical decomposition processes underlying the rot or the necroses have taken place.

In an advantageous embodiment of the invention, a control device adjusts the root crop conveyor device in dependence on the result data. In particular, the evaluation device provides the result data to the control device for this purpose. The control device preferably automatically adapts at least one operating parameter of the root crop conveyor. The adaptation preferably takes place during operation of the root crop conveyor device and does not require operation to be interrupted. In particular, the control device is configured such that the quality of the root crops does not fall below a limit value if possible, and at the same time a throughput of harvested material through the root crop conveyor device is as high as possible.

Any change to an operating parameter is in particular followed by a waiting period (dead time) during which no further change to the same operating parameter takes place. The waiting period is in particular as long as is required by the root crops in operation to travel from the element, the operating parameter of which has been changed and which is arranged upstream of the measuring device along the conveying section, to the measuring device. Furthermore, the waiting period is to be chosen in dependence on the measurement frequency. The operating parameter is changed in particular at least if a proportion of blemished root crops in a specific number of root crops last tested exceeds a limit value. In this case, the root crop conveyor device is to be adjusted in particular in favor of more gentle handling of the root crops. If the proportion falls significantly below the limit value, the root crop conveyor device is to be adjusted in the opposite way, so as to increase the throughput.

In an advantageous embodiment of the invention, the operating parameter is not changed until the operator agrees to the change. Instead of the automatic control, the change is proposed to the operator as soon as the evaluation or control device considers the change to be expedient or necessary. Alternatively, in a simpler version of the invention, the user is simply informed of an inadequate condition, whereupon he can change the operating parameter manually.

The evaluation device is coupled with the measuring device in particular wirelessly or in a wired manner, or included in the same computing unit. Alternatively or in addition, the evaluation device and the control device are included in the same computing unit.

The control device preferably adjusts a circulation speed, a rotational speed, a pitch, a gap width and/or a height of at least one conveying element and/or of at least one separating element of the root crop conveyor device relative to a machine frame. The conveying or separating element is in particular in the form of a belt, roller, guide plate, deflector plate, deflecting roller, elevator, hedgehog belt, finger web or comb. The rotational speed is in particular a rotational speed of a component for conveying or cleaning, or separating, the harvested material, preferably a rotational speed of a rotor for generating an air stream. To this end, the control device is in particular coupled with hydraulic motors, hydraulic valves and/or hydraulic cylinders. Alternatively or in addition, the control device is in particular coupled with electric motors, linear drives and/or electric circuits. In the case of a harvester which in operation is pulled by a tractor and which includes the root crop conveyor, the control device preferably adjusts the driving speed of the tractor by way of the so-called tractor-implemented management (TIM). In the case of a self-driving harvester which includes the root crop conveyor, the control device adjusts the driving speed of the harvester in particular directly.

Conveying elements and separating elements are those elements of the root crop conveyor device that are in direct contact with the harvested material during operation. Conveying elements are in particular traveling screens that circulate during operation. Separating elements are in particular plucking rollers, hedgehog belts, etc. Particularly preferably, the control device adjusts a lifting depth, the frequency of beating elements or gap widths.

Preferably, the measurement data are measured at least in part by means of an optical sensor of the measuring device. The optical sensor is configured in particular to determine gray scale values, or the brightness, of different image sections. The optical sensor is in particular arranged above the root crop during operation. The evaluation device calculates the result data particularly preferably in dependence on a light scattering. To this end, the measurement data of the optical sensor are evaluated such that a measure of the scattering of reflected light is determined. The optical sensor is particularly suitable for the measurement because pressure spots reflect light differently, in particular scatter it further, than intact regions of the root crop.

The optical sensor is in particular in the form of a camera, preferably a monochrome camera, and in particular comprises a bandpass filter. This form of calculation of the result data leads to a particularly reliable assessment of the tendency of the root crop to rotting because it has been shown that the light-reflecting nature of root crops is significantly different in the region of pressure spots compared to other regions. Alternatively or in addition to the variant described above, hyperspectral imaging, in particular at 800 to 2000 nm, a thermal imaging camera, ultrasound and/or radar are used for the evaluation.

In order to generate a reflection of light, the root crop is preferably irradiated by means of a laser, in particular by means of a line laser. In particular, a line laser is associated directly with the optical sensor. Lasers are distinguished by the emission of monochromatic light. Interference in the evaluation of the light scattering can thus be minimized. In order to further optimize the method, a measuring chamber in which the root crop is located during the measurement is at least partially screened from daylight.

The laser preferably emits radiation with a wavelength of between 400 and 1400 nm, preferably between 600 and 1000 nm, particularly preferably of 900 nm. The power of the laser is in a range between 0.1 and 2 mW/cm. With these light parameters, differences in the light scattering that are induced by pressure spots can be detected particularly clearly.

By means of these preferred embodiments of the invention, it is possible to identify damage which cannot be detected by sorting staff conventionally employed in particular during the operation of root crop harvesters, or on the basis of a live image of the harvested material. There is thus a significantly more sound data basis for the optimization of the harvesting result.

Alternatively or in addition to the optical sensor, the measurement data are preferably measured at least in part by means of a tactile sensor of the measuring device. The tactile sensor moves at least partially toward the root crop for the measurement. By means of the tactile sensor, which is in direct contact with the root crop at least temporarily during the measurement, changed root crop structures, in particular greater softness, in the region of pressure spots can be detected particularly easily.

The result data are preferably dependent on a force increase and/or a pressure increase over a distance which a sensing element of the tactile sensor travels in contact with the root crop. By means of the force- or pressure-distance ratio, which in particular is contained in the measurement data, in particular a firmness of the root crop and an elasticity of the root crop skin can be characterized. Alternatively or in addition to the ratio, the measurement data include in particular a maximum force or a maximum pressure which was detected along a predefined distance. The measurement here takes place non-destructively, to the benefit of a root crop yield, or destructively to the benefit of reliable measurement data, wherein the resistance to penetration is preferably a central parameter to be determined.

The sensing element of the tactile sensor is in particular movable in a horizontal movement direction. The measurement can thus be carried out in a simplified manner at a crown or heel end of the root crop, which are generally spaced apart from one another in the main direction of extension of the root crop. This is the case because those ends are generally oriented laterally.

In an advantageous embodiment of the invention, the root crop, prior to the measurement, is spatially separated from a stream of harvested material containing root crops. In particular, the root crop, after it has been separated, is fixed in the region of the sensor, in particular in the measuring chamber. To that end, the measuring device in particular comprises a movable fixing device. For the spatial situation, the measuring device in particular has an associated bypass conveying section into which the root crop passes in particular under the force of gravity. After the measurement, which is preferably non-destructive, the bypass conveying section guides the root crop in particular to the stream of harvested material again. Preferably, the root crop is guided to the stream of harvested material again only if it has been classified as blemish-free. The fixing device is in particular movable such that the condition of the root crop can be measured from different sides of the root crop by the same sensor.

The root crop is separated from the stream of harvested material in particular after it has traveled at least two thirds of a conveying section of the root crop conveyor. The conveying section extends from a loading end to a discharge end of the root crop conveyor. Alternatively or in addition, the root crop is separated after it has been transferred to a conveying element which extends up to the discharge end or is arranged directly upstream of a bunker. The conveying element is in particular in the form of a sorting belt. The advantage of not separating the root crop until the rear region of the conveying section is that a large part of the influences exerted on the root crop by the root crop conveyor device has already been taken into account in the measurement.

The conveying section is preferably formed by a plurality of conveying elements, which are preferably configured to circulate during operation. The conveying elements in particular each have a width of at least 50 cm. The loading end is defined in particular by lifting blades. The discharge end is defined in particular by the reversal region of a conveyor belt, in particular of the last or penultimate conveyor belt of the conveying section.

By means of the method, measurement data of at least one root crop per minute are in particular recorded. Preferably, measurement data of a specific proportion of the root crops of the harvested material are recorded continuously. Particularly preferably, measurement data of all the conveyed root crops are recorded.

As an alternative to the measuring device included in the root crop conveyor, the measuring device is part of a measuring station, in particular a mobile measuring station. The measuring station carries out the measurement in particular between harvesting of the root crop and storage thereof. The measuring station is coupled with the root crop conveyor device or a root crop harvester preferably wirelessly or in a wired manner and adjusts it preferably automatically.

The adjustment of the root crop conveyor, or of at least a component thereof, preferably takes place on the basis of measurement data of different measuring devices, which in particular are positioned at different locations along a conveying section of the root crop conveyor. Alternatively or in addition, at least one sensor of the measuring device is moved, in particular by means of an arm, relative to the root crop and/or relative to the measuring frame between two measurements, or the measuring device comprises a plurality of sensors. The sensors serve in particular to measure different regions of the same root crop. The result data can thus be given a particularly sound basis, and a particularly reliable picture of the quality of the root crop, or of a plurality of root crops, can be determined.

An advantage of the optical sensor compared to the tactile sensor is the possibility of using the optical sensor directly above a portion of the conveying section and without the root crop necessarily being separated beforehand. Also, the condition is not changed by the measurement itself. In particular, the measuring device having the optical sensor is configured to simultaneously measure the condition of different root crops which in particular are conveyed by the same conveying element of the conveying section.

The result data are preferably calculated in dependence on measurement data of different measurements, which are carried out in particular by measuring devices arranged in different portions of the conveying section. In particular a loading of the root crop along the conveying section can thus be measured or designed so as to identify at least the most critical conveying or separating element.

Preferably, at least one measurement takes place per minute. Alternatively or in addition, the provision or adjustment based thereon takes place not more than one minute after the underlying measurement. If the provision or adjustment is based on measurement data measured at different times, preferably at least some of the measurement data were measured not more than one minute before the provision or adjustment. Apart from the waiting time, the method in particular allows continuous adaptation of the root crop conveyor.

Preferably, the evaluation device assigns the measurement data, or at least a characteristic value dependent thereon, to location data and/or batch data. The quality of the root crops can thus be determined in dependence on the location at which they were harvested, in order to adapt the selection of root crop varieties, or the treatment thereof, thereto. By assigning the measurement data or the characteristic value to batch data, batches that have a greater tendency to rotting can be stored such that they are removed from storage again within a short time, whereas more resilient batches can be stored for a longer period of time. The batch data preferably include a weight, a harvesting time and/or a storage location. The associated data are in particular stored by the evaluation device or in particular provided wirelessly to a server.

The object is further achieved by a root crop conveyor device which comprises a measuring device configured to measure root crops. The measuring device in turn comprises an optical and/or tactile sensor described above and/or below. The root crop conveyor device is configured to carry out the method described above and/or below. The root crop conveyor device is in particular in the form of a storage or cleaning device.

There is preferably associated with the measuring device a measuring-conveying element which is configured to convey the root crop from the conveying section to the measuring chamber of the measuring device and/or away from the measuring chamber. The measuring-conveying element in particular forms the bypass conveying section. The measuring-conveying element is in particular in the form of a traveling screen and/or has a width of less than 50 cm. The measuring-conveying element is in particular activated only for measurement. By means of the measuring-conveying element, separation of the root crop from the harvested material is more easily possible.

In an advantageous embodiment of the invention, a separating element is arranged between the measuring chamber and the conveying section of the root crop conveyor. In a closed position, the separating element delimits the conveying section with respect to the measuring chamber. In an open position, the separating element is configured to allow the root crop to pass from the conveying section to the measuring device. In particular, the separating element is arranged beneath at least part of an element that also forms the conveying section, so that the root crop, in the open position of the separating element, passes under the force of gravity to the measuring chamber or to the measuring-conveying element. The separating element is in particular mounted so as to be displaceable.

The object is further achieved by a root crop harvester, in particular a potato or beet harvester, which has a root crop conveyor device described above and/or below. The root crop harvester is in particular a root crop harvester which is self-driving in operation or which is pulled by a tractor in operation.

BRIEF DESCRIPTION OF THE DRAWINGS

Reference is now made more particularly to the drawings, which illustrate the best presently known mode of carrying out the invention and wherein similar reference char-acters indicate the same parts throughout the views.

FIG. 13 is a side view of a root crop harvester according to the invention.

DETAILED DESCRIPTION OF THE DRAWINGS

Figure 1:
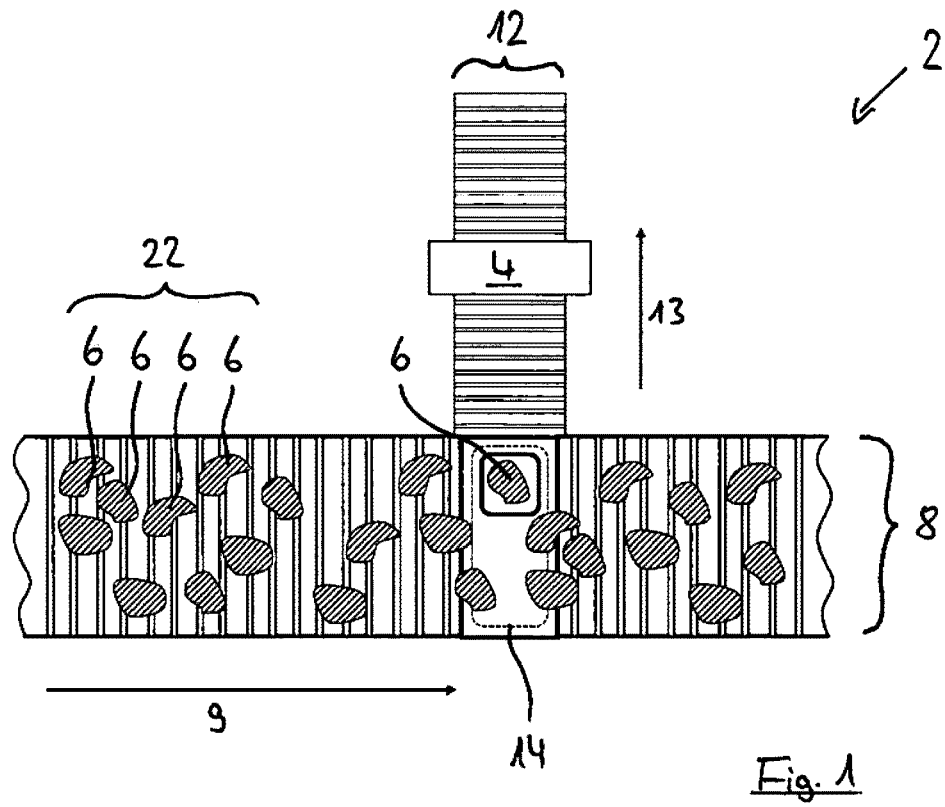
FIG. 1 is a partial plan view of a first root crop conveyor device according to the invention with a separating element in a closed position.

The features explained below of the exemplary embodiments according to the invention can also be subject-matter of the invention individually or in combinations other than those shown or described. Where expedient, parts that are functionally have the same effect are provided with identical reference signs.

The root crop conveyors 2 according to FIGS. 1 to 10 each have a conveying section 8, which during operation moves a stream of harvested material 22, which includes root crops 6, in a conveying direction 9. Each of the root crop conveyors 2 shown comprises a measuring device 4 for measuring measurement data 50 that characterize a condition of the conveyed root crops 6.

Figure 2:
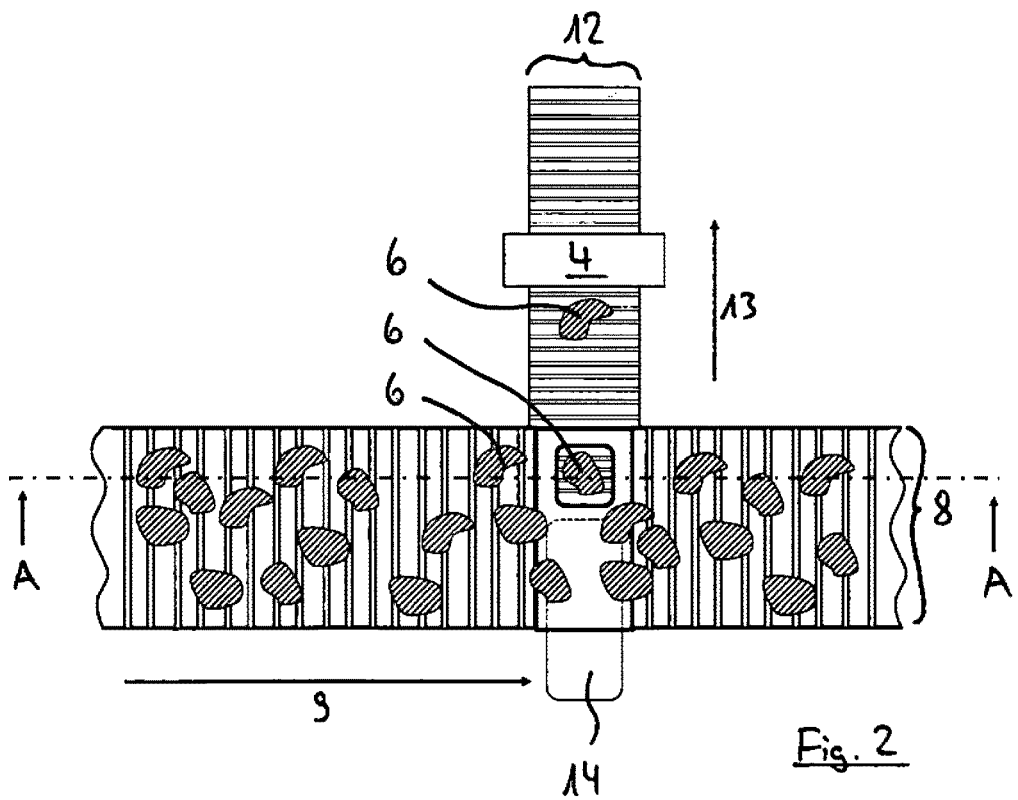
FIG. 2 shows the partial plan view according to FIG. 1 with the separating element in an open position.
Figure 3:
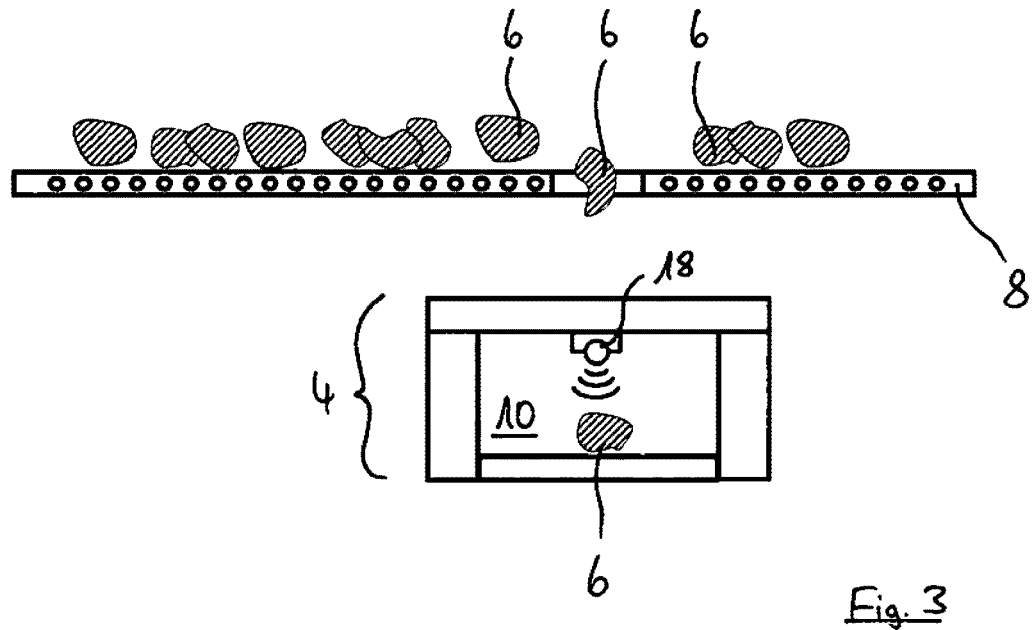
FIG. 3 is a sectional view of the first root crop conveyor device according to section line A-A from FIG. 2.
Figure 4:
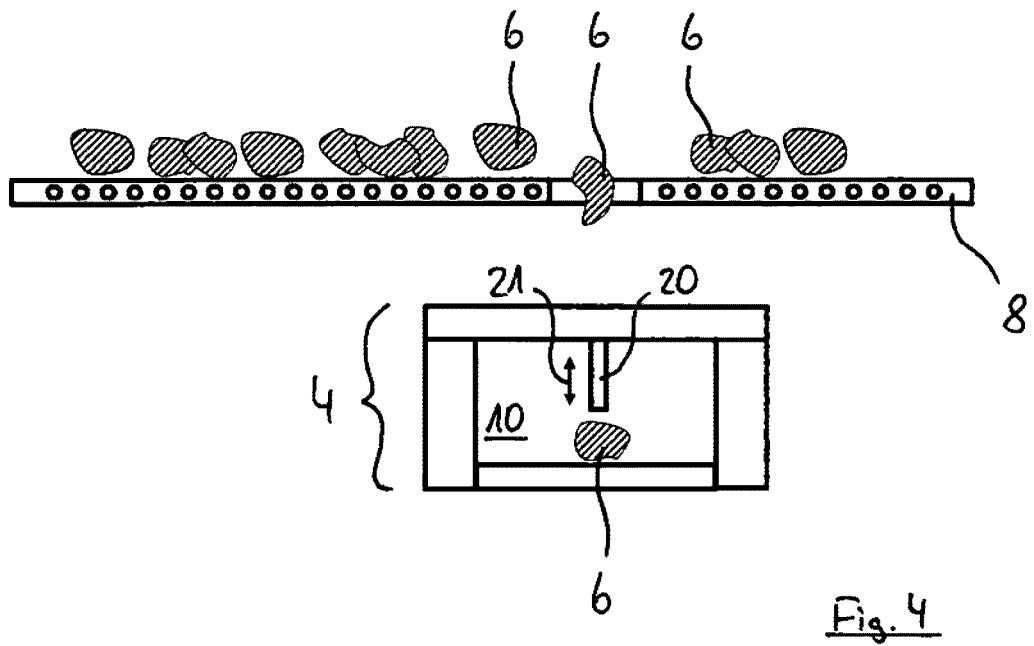
FIG. 4 is a sectional view analogous to FIG. 3 of a second root crop conveyor device according to the invention.
Figure 5:
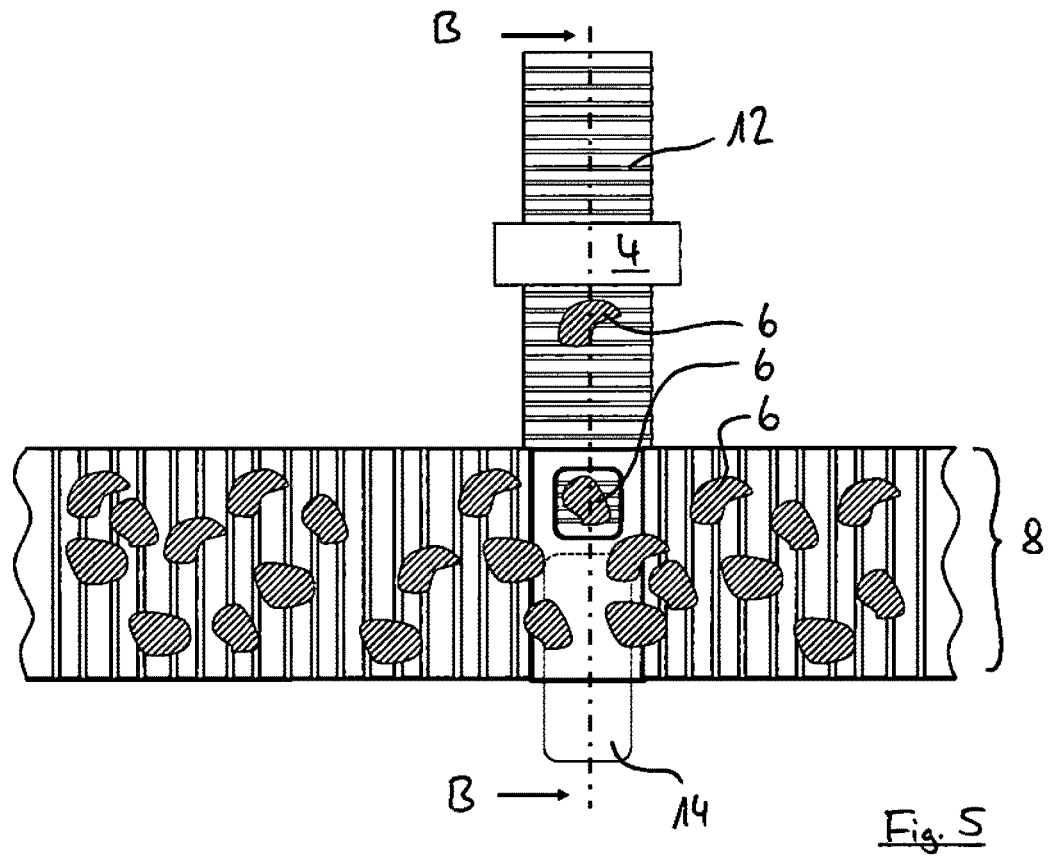
FIG. 5 is a partial plan view of the first root crop conveyor.
Figure 6:
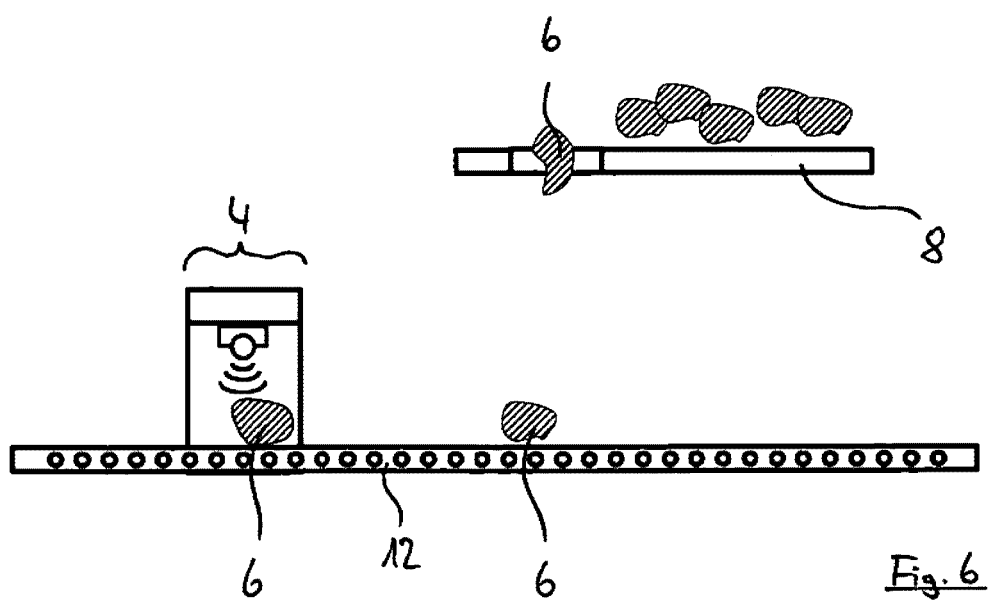
FIG. 6 is a further sectional view of the first root crop conveyor device according to section line B-B from FIG. 5.
Figure 7:
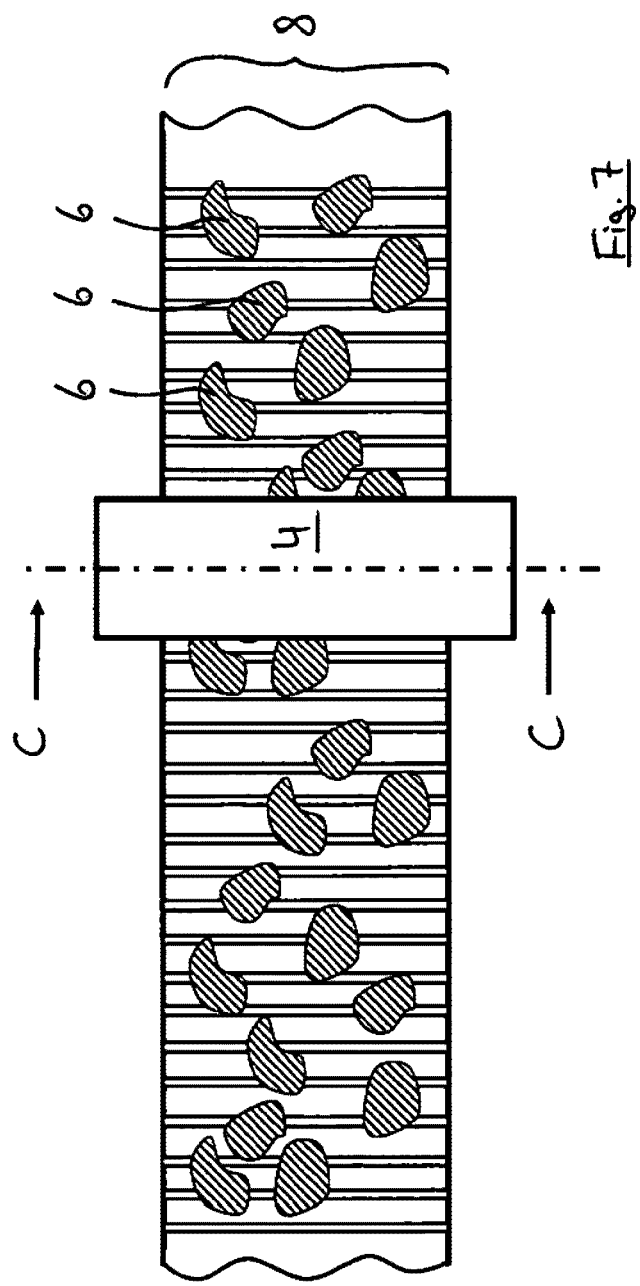
FIG. 7 is a partial plan view of a third root crop conveyor.
Figure 8:
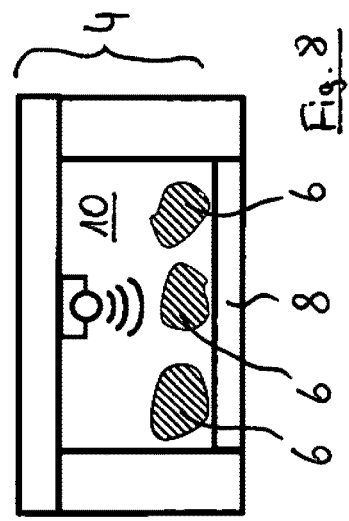
FIG. 8 is a sectional view of the third root crop conveyor device according to section line C-C from FIG. 7.
Figure 9:
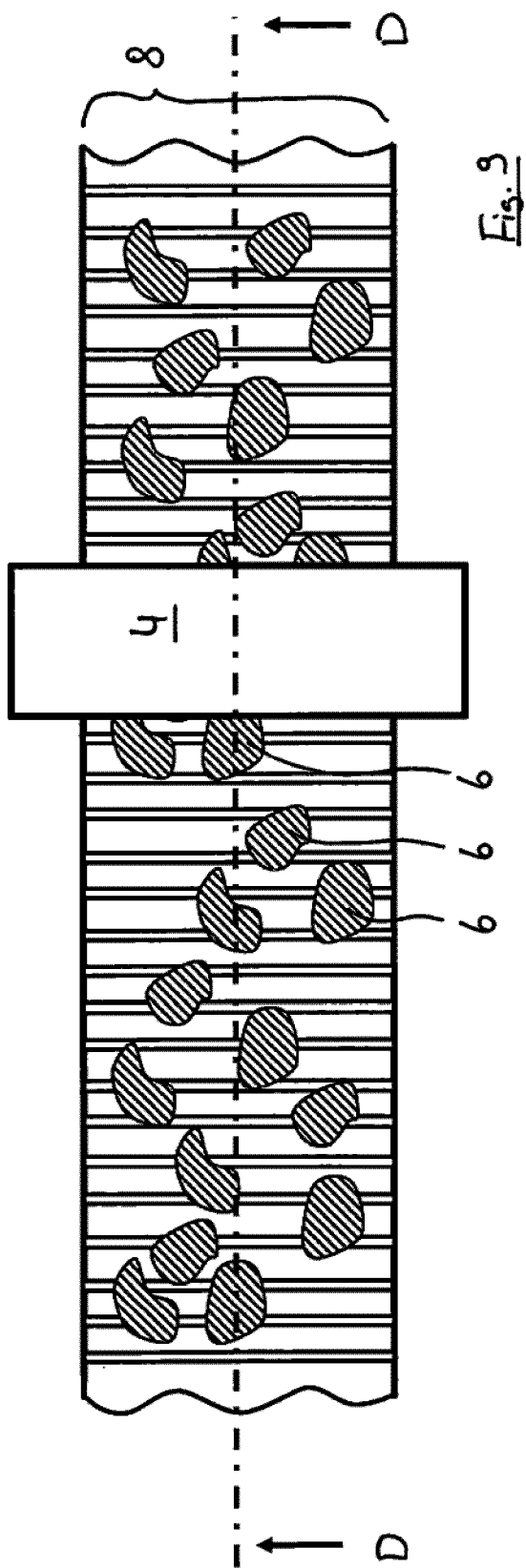
FIG. 9 is a partial plan view of the third root crop conveyor.
Figure 10:
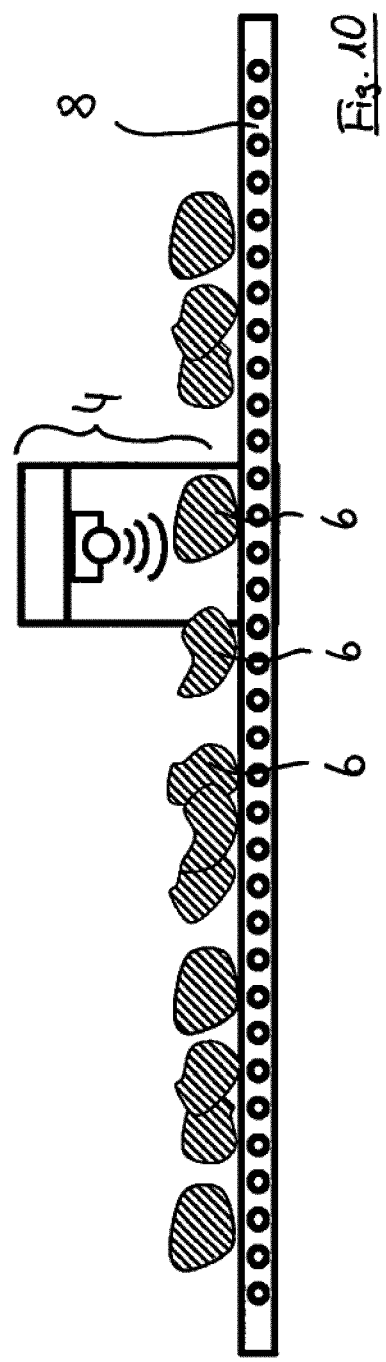
FIG. 10 is a further sectional view of the third root crop conveyor device according to section line D-D from FIG. 9.

The first and second root crop conveyors 2 each have a separating element 14 which is arranged between the conveying section 8 and a measuring-conveying element 12. The separating element 14 can be transferred from a closed position (FIG. 1) into an open position (FIG. 2). In the open position, at least one root crop 6 passes onto the measuring-conveying element 12, which conveys the root crop 6 to the measuring device 4 and, after the measurement, away from the measuring device 4 in the measuring-conveying direction 13.

Inside the measuring device 4, the first and third root crop conveyors 2 (see FIG. 3 and FIG. 8) have an optical sensor 18. The optical sensor measures light reflected by at least one root crop 6 in a measuring chamber 10. As an alternative to the optical sensor 18, the second root crop conveyor device 2 has a tactile sensor 20, which is movable inside the measuring chamber 10 in a movement direction 21 (see FIG. 4).

The root crop harvester 29 according to FIG. 13 has a root crop conveyor device 2. The conveying section 8 of the root crop harvester 29 extends from loading end 28, which is defined by the lifting blade, to a bunker 24. Upstream of the bunker 24 there is arranged a conveying element 26 in the form of a sorting table, above which the measuring device 4 is arranged. The root crop harvester 29 comprises a machine frame 16 on which the movable components described above are movably arranged.

Figure 11:
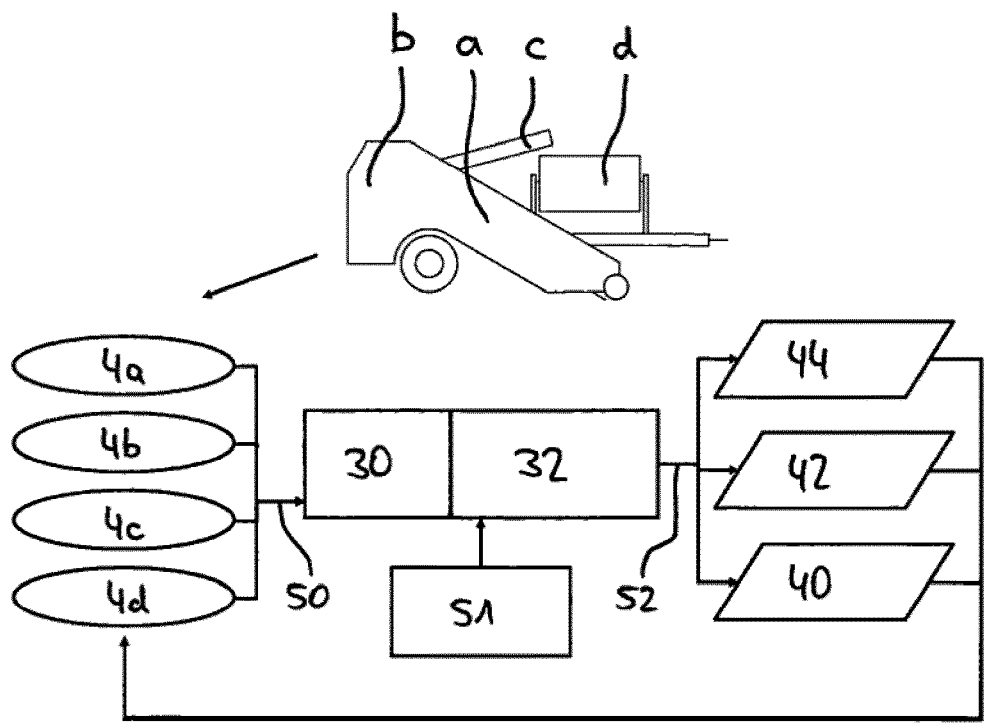
FIG. 11 is a schematic flow chart of a first method according to the invention.
Figure 12:
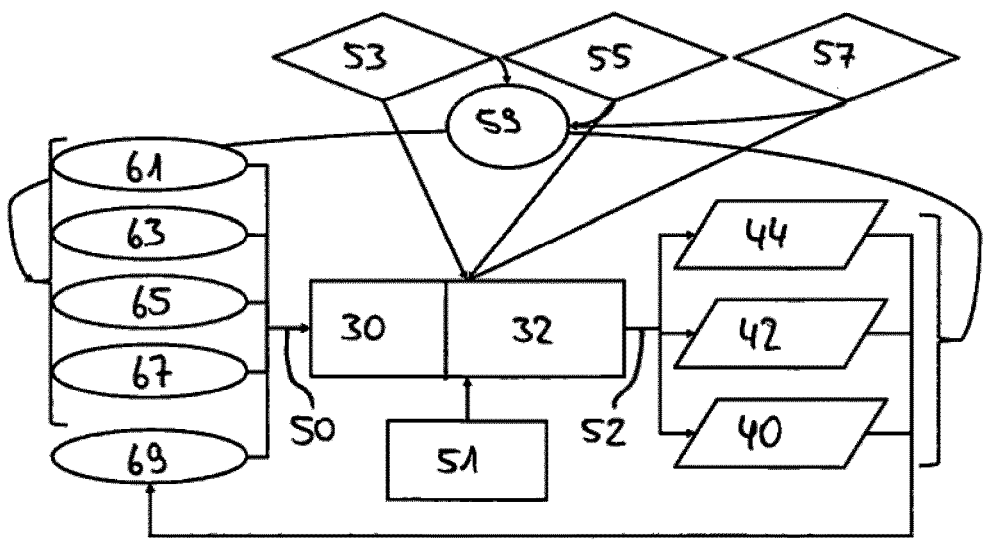
FIG. 12 is a schematic flow chart of a second method according to the invention.

Two embodiments of the method according to the invention are illustrated by FIGS. 11 and 12. According to FIG. 11, measurement data 50 are recorded by four measuring devices 4a, 4b, 4c, which are arranged at different locations along the conveying section 8 of the root crop harvester 29 (see a to d, top). On the basis of the measurement data, an evaluation device 30 and a control device 32 calculate result data 52 for adjustment of the root crop harvester 29. For the calculation of the result data 52, stored data 51, which include rules, algorithms and limit values, are used. By means of the result data 52, specifically a lifting depth 42, a driving speed 44 and a further parameter 40 of the conveying section 8 are adjusted.

FIG. 12 shows an extended embodiment of the method according to the invention. Further data can here be taken into account for the calculation of the result data 52. Specifically, a lifting strategy 55 is to be specified by the operator; in addition, weather and soil data 53 are taken into account. Moreover, extraneous material data 57, which in particular include a quantity of clods, are taken into account. These values also have an active influence 59 on the relationship between the parameters adjusted by the result data 52 and the fill levels, influenced thereby, at the start 61 of the traveling screen, at the end 63 of the traveling screen, the pressure of the separating devices 65 and blockage values 67. The last-mentioned parameters, as well as the actual values 69 that are directly associated with the adjusted parameters 40, 42, 44, are included as measurement data 50 in the further control.

The invention claimed is:

1. A method for determining a characteristic of harvested material conveyed by a root crop conveyor device, the method comprising the following steps:
    measuring, by at least one measuring device, measurement data that characterize at least one condition of at least one root crop conveyed by the root crop conveyor device,
    calculating, by an evaluation device, result data which are dependent at least on the measurement data and are suitable for adjustment of the root crop conveyor device,
    providing, by the evaluation device, the result data or a signal dependent thereon,
    wherein the measurement data are measured at least in part by a tactile sensor of the measuring device which is to be moved toward the root crop.

2. The method as claimed in claim 1, wherein the evaluation device, on the basis of the measurement data, determines information relating to the presence and/or to the degree of mechanical damage.

3. The method as claimed in claim 1, wherein a control device adjusts the root crop conveyor device in dependence on the result data.

4. The method as claimed in claim 3, wherein the control device adjusts a circulation speed, a rotational speed, a pitch, a gap width and/or a height of at least one conveying element and/or of at least one separating element of the root crop conveyor device relative to a machine frame, and/or a driving speed of the root crop conveyor device.

5. The method as claimed in claim 1, wherein the measurement data are measured at least in part by an optical sensor of the measuring device.

6. The method as claimed in claim 5, wherein the evaluation device calculates the result data in dependence on a light scattering.

7. The method as claimed in claim 5, wherein the root crop is irradiated by a laser in order to generate a reflection of light.

8. The method as claimed in claim 7, wherein the laser emits radiation with a wavelength of between 400 and 1400 nm.

9. The method as claimed in claim 1, wherein the result data are dependent on a force increase and/or a pressure increase over a distance which a sensing element of the tactile sensor travels in contact with the root crop.

10. The method as claimed in claim 1, wherein the root crop, prior to the measurement, is spatially separated from a stream of harvested material.

11. The method as claimed in claim 10, wherein the root crop, prior to the measurement, is fixed in the region of the sensor.

12. The method as claimed in claim 1, wherein the result data are calculated in dependence on measurement data of different measurements.

13. The method as claimed in claim 12, wherein the different measurements are carried out by measuring devices arranged in different portions of the conveying section.

14. The method as claimed in claim 1, wherein at least one measurement takes place per minute and/or the provision of the result data or the adjustment in dependence on the result data takes place not more than one minute after the underlying measurement or at least one of the underlying measurements.

15. The method as claimed in claim 1, wherein the evaluation device assigns the measurement data, or at least a characteristic value dependent thereon, to location data and/or batch data.

16. A root crop conveyor device comprising:
    a measuring device configured to measure root crops, said measuring device including a tactile sensor or including an optical sensor and a tactile sensor, and being configured to carry out the method as claimed in claim 1.

17. The root crop conveyor device as claimed in claim 16, further including a measuring-conveying element associated with the measuring device, the measuring-conveying element being configured to convey the root crop from the conveying section to a measuring chamber of the measuring device, inside which the root crop is arranged during the measurement, and/or away from the measuring chamber.

18. The root crop conveyor device as claimed in claim 17, wherein a separating element is arranged between the measuring chamber and the conveying section of the root crop conveyor device, wherein when the separating element is in a closed position, it delimits the conveying section with respect to the measuring chamber and in an open position is configured to allow the at least one root crop to pass from the conveying section to the measuring device.

19. A root crop harvester having a root crop conveyor device as claimed in claim 16.

20. A method for determining a characteristic of harvested material conveyed by a root crop conveyor device, the method comprising the following steps:
    measuring, by at least one measuring device, measurement data that characterize at least one condition of at least one root crop conveyed by the root crop conveyor device,
    calculating, by an evaluation device, result data which are dependent at least on the measurement data and are suitable for adjustment of the root crop conveyor device, providing, by the evaluation device, the result data or a signal dependent thereon,
    wherein the root crop, prior to the measurement, is spatially separated from a stream of harvested material,
    wherein the root crop is separated from the stream of harvested material after it has traveled at least two thirds of a conveying section of the root crop conveyor device extending from a loading end to a discharge end and/or after it has been transferred to a conveying element which extends up to the discharge end or is arranged directly upstream of a bunker.

21. A method for determining a characteristic of harvested material conveyed by a root crop conveyor device, the method comprising the following steps:
    measuring, by at least one measuring device, measurement data that characterize at least one condition of at least one root crop conveyed by the root crop conveyor device,
    calculating, by an evaluation device, result data which are dependent at least on the measurement data and are suitable for adjustment of the root crop conveyor device, providing, by the evaluation device, the result data or a signal dependent thereon,
    wherein the measurement data are measured at least in part by an optical sensor of the measuring device, wherein the measurement data are measured by different sensors of the measuring device and/or at least one sensor of the measuring device is moved relative to the root crop and/or relative to the machine frame between two measurements.

\* \* \* \* \*